(12) United States Patent
Jarvis et al.

(10) Patent No.: US 6,424,976 B1
(45) Date of Patent: Jul. 23, 2002

(54) METHOD OF IMPLEMENTING A FORWARD COMPATIBILITY NETWORK DIRECTORY SYNTAX

(75) Inventors: Brian Jarvis; Layne Izatt, both of Orem; Mark Hinckley, Lincoln, all of UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/533,442

(22) Filed: Mar. 23, 2000

(51) Int. Cl.$^7$ ............................................... G06F 17/30
(52) U.S. Cl. ........................................................ 707/201
(58) Field of Search ......................................... 707/201

(56) References Cited

U.S. PATENT DOCUMENTS

| | | | |
|---|---|---|---|
| 4,580,218 A | 4/1986 | Raye | 364/300 |
| 5,412,772 A | 5/1995 | Monson | 395/155 |
| 5,485,606 A * | 1/1996 | Midgdey et al. | 360/27 |
| 5,499,358 A | 3/1996 | Nevarez | 395/600 |
| 5,579,516 A * | 11/1996 | Van Maren et al. | 707/1 |
| 5,594,863 A | 1/1997 | Stiles | 395/182.13 |
| 5,608,903 A | 3/1997 | Prasad et al. | 395/610 |
| 5,627,979 A * | 5/1997 | Chang et al. | 395/335 |
| 5,628,007 A | 5/1997 | Nevarez | 395/612 |
| 5,652,854 A | 7/1997 | Wong | 395/416 |
| 5,671,414 A | 9/1997 | Nicolet | 395/684 |
| 5,677,851 A | 10/1997 | Kingdon et al. | 364/514 |
| 5,701,459 A | 12/1997 | Millett et al. | 395/603 |
| 5,717,912 A | 2/1998 | Millett et al. | 395/603 |
| 5,719,786 A | 2/1998 | Nelson et al. | 364/514 |
| 5,745,902 A * | 4/1998 | Miller et al. | 707/200 |
| 5,758,344 A | 5/1998 | Prasad et al. | 707/10 |
| 5,761,499 A | 6/1998 | Sonderegger | 395/610 |
| 5,784,560 A | 7/1998 | Kingdon et al. | 395/200.31 |
| 5,787,175 A | 7/1998 | Carter | 380/25 |
| 5,793,546 A * | 8/1998 | Tanaka et al. | 360/27 |
| 5,794,232 A | 8/1998 | Mahlum et al. | 707/3 |
| 5,832,274 A | 11/1998 | Cutler et al. | 395/712 |
| 5,832,275 A | 11/1998 | Olds | 395/712 |
| 5,832,487 A | 11/1998 | Olds et al. | 707/10 |
| 5,870,734 A * | 2/1999 | Kao | 707/2 |
| 5,873,079 A | 2/1999 | Davis, III et al. | 707/3 |
| 5,878,415 A | 3/1999 | Olds | 707/9 |
| 5,878,419 A | 3/1999 | Carter | 707/10 |
| 5,884,304 A | 3/1999 | Davis, III et al. | 707/4 |
| 5,886,703 A | 3/1999 | Mauldin | 345/423 |
| 5,893,116 A | 4/1999 | Simmonds et al. | 707/201 |
| 5,913,025 A | 6/1999 | Higley et al. | 395/187.01 |
| 5,913,209 A | 6/1999 | Millett | 707/3 |
| 5,915,253 A | 6/1999 | Christiansen | 707/103 |
| 5,924,096 A | 7/1999 | Draper et al. | 707/10 |
| 5,933,826 A | 8/1999 | Ferguson | 707/9 |
| 5,950,198 A | 9/1999 | Falls et al. | 707/8 |
| 5,956,718 A | 9/1999 | Prasad et al. | 707/10 |
| 5,964,872 A | 10/1999 | Turpin | 713/1 |
| 5,983,223 A | 11/1999 | Perlman | 707/6 |
| 5,983,234 A | 11/1999 | Tietjen et al. | 707/103 |
| 6,016,499 A | 1/2000 | Ferguson | 707/104 |
| 6,047,312 A | 4/2000 | Brooks et al. | 709/203 |
| 6,049,799 A | 4/2000 | Mangat et al. | 707/10 |

(List continued on next page.)

Primary Examiner—Wayne Amsbury
(74) Attorney, Agent, or Firm—Haynes and Boone, LLP

(57) ABSTRACT

System and method for implementing a forward compatibility syntax in a directory services environment is described. In one embodiment, data comprising an attribute according to a new syntax that is supported by newer servers, but not by older servers, is separated into data with respect to which referential integrity is not a concern (hereinafter "blob data") and data with respect to which referential integrity is a concern (hereinafter Distinguished Names ("DNs")). The two types of data are then combined according to a forward compatibility ("FC") syntax that is supported by both older and newer servers. Only certain, newer, servers understand and convert between the FC syntax and the actual new syntax; older servers are capable of supporting the FC syntax without needing to understand it.

21 Claims, 2 Drawing Sheets

U.S. PATENT DOCUMENTS

| | | | |
|---|---|---|---|
| 6,052,724 A | 4/2000 | Willie et al. | 709/223 |
| 6,061,726 A | 5/2000 | Cook et al. | 709/226 |
| 6,061,740 A | 5/2000 | Ferguson et al. | 709/246 |
| 6,321,374 B1 * | 11/2001 | Choy | 707/2 |
| 6,370,539 B1 * | 4/2002 | Ashby et al. | 701/200 |
| 6,374,265 B1 * | 4/2002 | Chen et al. | 707/202 |

* cited by examiner

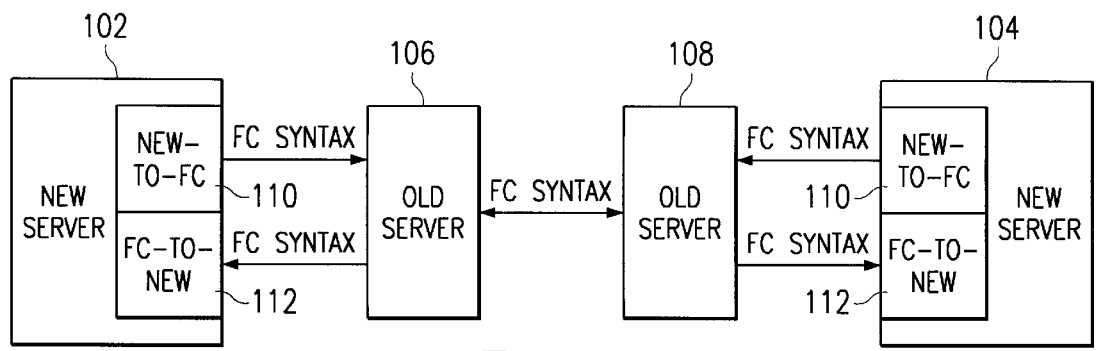
Fig. 1
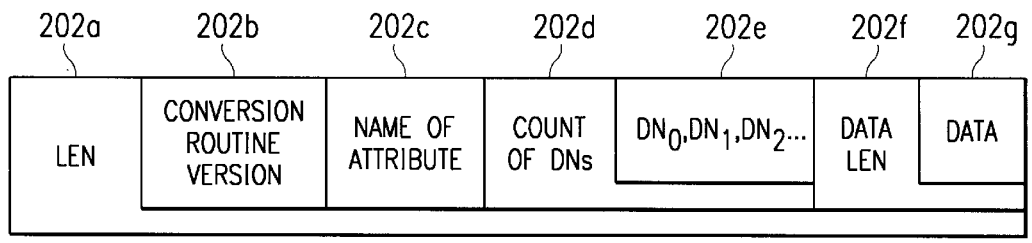
Fig. 2
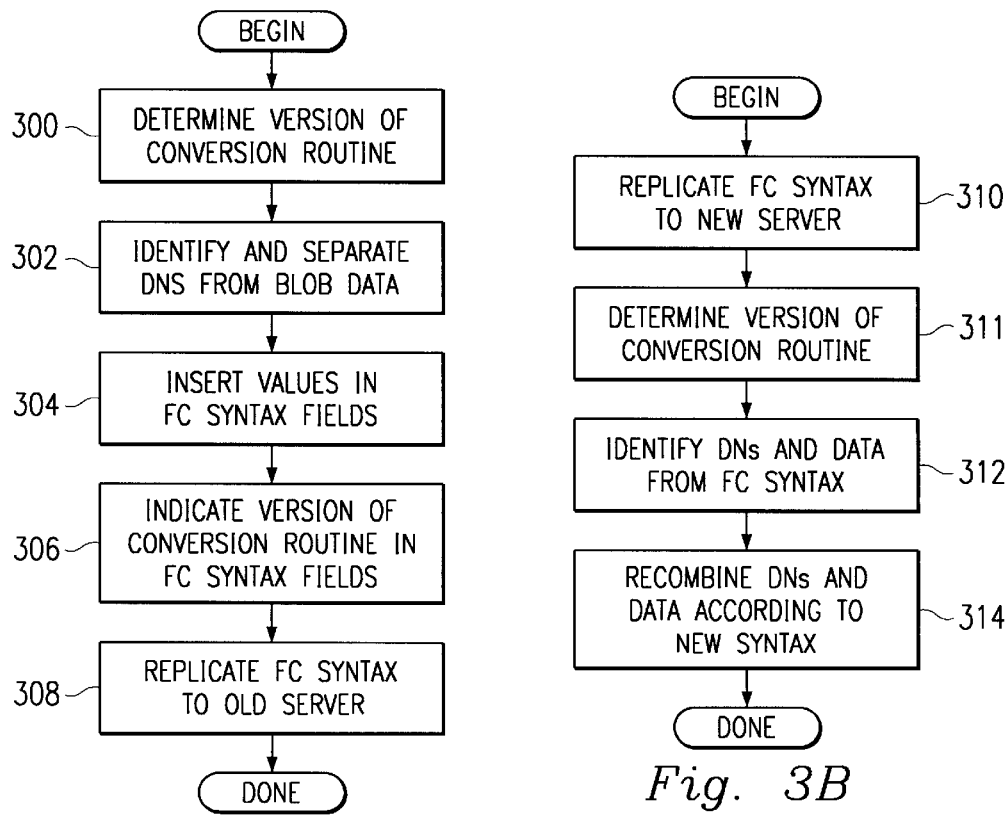
Fig. 3A
Fig. 3B

METHOD OF IMPLEMENTING A FORWARD COMPATIBILITY NETWORK DIRECTORY SYNTAX

BACKGROUND

This invention relates generally to directory syntaxes and, more particularly, to a forward compatibility syntax for facilitating forward, as well as backward, compatibility between servers.

Personal computers or workstations may be linked in a computer network to facilitate the sharing of data, applications, files, and other resources. One common type of computer network is a client/server network, where some computers act as servers and others as clients. In a client/server network, the sharing of resources is accomplished through the use of one or more servers. Each server includes a processing unit that is dedicated to managing centralized resources and to sharing these resources with other servers and/or various personal computers and workstations, which are known as the "clients" of the server.

Directories and directory services are often provided to enable an environment for a digital entry of a particular resource. One example of a directory service is Novell Directory Services ("NDS"), developed by Novell, Inc. of Provo, Utah. NDS provides a logical tree-structure view of all resources on the network so that clients can access them without knowing where they are physically located. The entry of a resource is only available by directly accessing the directory.

Novell Directory Services ("NDS") is an object-oriented implementation of directory services that enables a user to build a model of a network using sophisticated naming schemes and a powerful distributed database. NDS provides everyone on the network with access to all network resources, regardless of whether the users or the resources are located. NDS may be divided into multiple, cooperating pieces, but it performs as a single, coherent information system.

In a directory, a syntax is an intrinsic type. In any distributed directory, such as NDS, syntaxes are difficult to add or change because there is almost always a mixture of older and newer versions of the directory on the various servers. The older versions do not understand the added or changed syntax while the newer ones do. This presents a serious problem in the context of replication because it results in inconsistent replicas between older and newer versions of the directory and even between the newer, but different, versions thereof.

One solution is to provide the servers having the older versions of the directory ("older servers") with the ability to handle a "blob"; that is, a chunk of data that is not understood by an older version of the directory but that can be replicated as a blob to both older servers and servers having newer versions of the directory ("newer servers"). Most directories have referential integrity with respect to the names of objects, meaning that if an object is renamed, or even deleted, all references to that object will be updated and react accordingly. As will be explained in greater detail below, referential integrity can present problems in connection with the use of blobs.

Currently, issues of backward compatibility in connection with directory syntaxes are handled on a case-by-case basis. For example, as previously suggested, if a new syntax consists solely of data, it is easy to pass between older and newer servers because nothing is going to act on it to change it (i.e., it presents no issues with respect to referential integrity), so the syntax can be handled as a blob. A problem is presented, however, if the new syntax includes a value that will change, such as the name of an object. In particular, when an object is renamed, every reference to the object has to be changed to reflect the new name. This is easy when the server holding a copy of the new syntax supports the new syntax and therefore understands which part of it is the name. In contrast, when the server holding the copy of the syntax is an older server that does not support the new syntax, it will not understand that part of it is a name. In the latter situation, when the name that forms a portion of the new syntax is updated, the system will function as if all instances of the name have been updated and when the syntax stored on the older server is sent to a server that supports the new syntax, that server will assume the name has been updated, which it has not. Clearly, this is a problem.

The following illustration highlights the problem. Consider a group object G with two member attributes referring to objects A and B. If A is renamed to C, every server holding a copy of G needs to be informed of the name change so that it can update its member list to show C instead of A. Special tags are kept on object A/C until the system is sure that all objects referring to that object have been informed of the name change. Now suppose that the two member attributes of G are not member attributes, but are some new kind of attribute involving a distinguished name ("DN") and other data as well. If G is held on an older version of the directory and the new attribute is stored as a blob, then the referential integrity of the directory will be broken because the old version of the directory does not know how to properly update the blob to reflect the changed name. Clearly, in situations such as these, blobs are not an adequate solution.

Accordingly, what is needed is a forward compatibility syntax that provides backward compatibility with older directory syntaxes and eliminates the problems associated with using simple blobs.

SUMMARY OF THE INVENTION

The present invention, accordingly, provides a system and method for implementing a forward compatibility syntax in a directory services environment, such as an NDS environment. In one embodiment, the invention comprises two primary components. The first component involves taking an attribute according to a new syntax that is supported by newer servers, but not by older servers and separating data with respect to which referential integrity is not a concern (hereinafter "blob data") from data with respect to which referential integrity is a concern (hereinafter Distinguished Names ("DNs")), and recombining the two types of data according to a forward compatibility ("FC") syntax that is supported by both older and newer servers. The second component involves the recognition that only certain, i.e., newer, servers understand and convert between the FC syntax and the actual new syntax, while the older servers just handle the FC syntax without actually needing to understand it.

In one aspect, an attribute according to a new syntax ("new attribute") is created on a newer server. When the new attribute is to be replicated to an older server that does not support the new syntax, the first server converts the new attribute from the new syntax to a forward compatibility ("FC") syntax, which includes two portions: a DN portion for containing data with respect to which referential integrity is a concern, and a data portion for containing data with respect to which referential integrity is not a concern. The older server is capable of recognizing and dealing with the DN portion of the FC syntax as a name; the remainder of the data is handled as a blob.

Accordingly, when, such as in the illustration set forth above, the name of an object contained in the DN portion of the FC syntax is changed, the older server is capable of recognizing the DN portion of the syntax as a name and updating it accordingly, thereby preserving the referential integrity of the system.

Subsequently, when an attribute according to the FC syntax ("FC attribute") is to be replicated from an older server to a newer server that does support the new syntax, the server to which the FC attribute is replicated handles conversion of the attribute back to the new syntax format.

A technical advantage achieved with the invention is that it can accommodate new syntaxes containing data with respect to which referential integrity is a concern, such as DNs.

Another technical advantage achieved with the invention is that the conversion takes place only on newer servers, so that no upgrades to older servers are necessary to support a new syntax.

BRIEF DESCRIPTION OF THE DRAWINGS

FIG. 1 is a block diagram of a directory services environment embodying features of the present invention.

FIG. 2 illustrates an exemplary embodiment of a forward compatibility syntax embodying features of the present invention.

FIGS. 3A and 3B are flowcharts illustrating the operation of exemplary conversion routines for converting between a new syntax and an FC syntax such as that illustrated in FIG. 2.

DESCRIPTION OF EMBODIMENTS

Figure 4A:
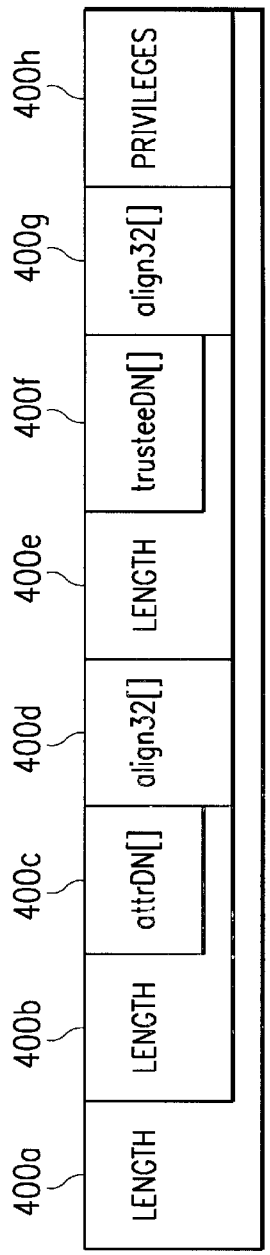
FIGS. 4A and 4B illustrate, respectively, an exemplary embodiment of a syntax supported by both old and new servers of the environment of FIG. 1 and a new syntax supported only by new servers of the environment of FIG. 1.

FIG. 1 is a block diagram of a directory services environment 100, such as NDS, comprising a plurality of new servers, such as new servers 102, 104, and old servers, such as old servers 106, 108. As used herein, a "new server" is one that supports both a new syntax and a forward compatibility ("FC") syntax described herein, such as that shown in FIG. 2; an "old server" is one that supports the FC syntax but not the new syntax. As illustrated in FIG. 1, a first new server 102 creates an attribute according to the new syntax (hereinafter "new attribute"), an example of which is shown and described in greater detail with reference to FIG. 4B. When the new attribute is to be replicated to an old server, such as the server 106, one of one or more versions of a first conversion routine, represented in FIG. 1 by a conversion routine 110, included on every new server 102, 104, converts the new attribute to an attribute according to an FC syntax (hereinafter "FC attribute"), an example of which is shown and described in greater detail with reference to FIG. 2. Operation of the conversion routine 110 is described below with reference to FIG. 3A, In general, the conversion routine 110 converts the new attribute from the new syntax to the FC syntax by separating the blob data from the DNs. The newly created FC attribute is forwarded to the old server 106 where it is stored and may be replicated in its current form to other old servers, such as the server 108. At some later point, when the FC attribute is replicated to a new server, such as the new server 104, one of one or more second conversion routines, represented in FIG. 1 by a second conversion routine 112, included on every new server 102, 104, converts the FC attribute from the FC syntax back to the new syntax, as described below with reference to FIG. 3B.

FIG. 2 illustrates an exemplary representation of one embodiment of a FC syntax 202 for use in connection with the present invention, it being recognized that there are any number of embodiments of the FC syntax. As shown in FIG. 2, the FC syntax 202 includes a first "len" field 202a, a "Conversion Routine Version" field 202b, a "Name of Attribute" field 202c, a "Count of DNs" field 202d, a "DNs" field 202e, a "data len" field 202f, and a "data" field 202g. The first len field 202a is a 32-bit unsigned integer that gives the length of the entire attribute in bytes. The Conversion Routine Version field 202b comprises two 32-bit unsigned integers that represent, respectively, the major and minor version numbers of the conversion routine that converted the attribute from its original syntax to the FC syntax. These version numbers may be necessary to identify the correct conversion routine for deconverting the attribute if more than one conversion routine exists. The Name of Attribute field 202c contains whatever is needed to identify what type of data the original data was. In one embodiment, it is implemented as the name of the attribute, although the attribute's object ID ("OID"), the full DN of the attribute in schema space, a tuned name, or other description of the data could have been chosen.

The Count of DNs field 202d is a 32-bit unsigned integer that gives a count of the number of DNs included in the count of DNs field 202e. The DNs field 202e is a sequence of DNs (e.g., $DN_0$, $DN_1$, $DN_2$, etc.). The DNs in the DNs field 202e are separated from the blob data in the Data field 202g because referential integrity must be maintained for the former. The data len field 202f is a 32-bit unsigned integer that gives the length of the Data field 202f in bytes. The Data field 202f contains all data from the new syntax other than DNs; in other words, the Data field 202f contains all of the blob data that has been separated from the DNs. The format of the blob data in the Data field 202f is determined by the version of the conversion routine that is used.

It will be recognized that there are any number of different formats that can be used to implement the FC syntax; all that is required is that the DN portion be recognizable as a name and identifiable separate and apart from the blob data.

FIGS. 3A and 3B respectively illustrate methods for converting an attribute according to a new syntax to and from the FC syntax. The operations illustrated in FIG. 3A are performed when new syntax is to be replicated from a new server, such as the new server 102 (FIG. 1), to an old server, such as the old server 106 (FIG. 1). In step 300, a determination is made as to which version of the conversion routine 110 (FIG. 1) is to be used to convert the attribute to the FC syntax. It should be recognized that this step 300 is optional, e.g., if there is only one version of the conversion routine, this step need not form a part of the conversion process. In step 302, the DNs are identified and separated from the blob data. In step 304, the blob data and the DNs, and other indicated values, are inserted in the appropriate fields in the FC syntax format, such as that shown in FIG. 2.

In step 306, the conversion routine version is indicated in the newly created FC attribute, e.g., in the fields 202b and 202c. In particular, the field 202c will identify the type of conversion routine to be used, while the field 202b will identify a version of the conversion routine of the type indicated is to be used. For example, there may be three versions of a conversion routine for a particular attribute A. The field 202c identifies the set of conversion routines (i.e., those associated with the attribute A), and the field 202b identifies which of the three versions is to be used.

It will be recognized that step 306 need only be performed if more than one version of the conversion routine for the identified attribute is used in the directory services environment 100. If only one version of the conversion routine is used, the field 202b may contain a default value or a number may be provided for identifying the single conversion routine. It should also be recognized that it is possible that a "new" server may have only a portion of all of the available versions of the conversion routine for a particular attribute; therefore, in a case where a "new" server does not have the identified version, it is treated as an "old" server for purposes of the invention and no conversion takes place, as hereinafter described. In step 308, the FC attribute is replicated to the old server 106. Because the FC syntax keeps the blob data separate from DNs, old servers, such as the old server 106, which are capable of handling DNs, are capable of maintaining the referential integrity of the DNs of the FC syntax without having to fully support the new syntax.

The operations illustrated in FIG. 3B are performed when an FC attribute is to be transferred from an old server, such as the old server 106 (FIG. 1), to a new server, such as the new server 102 (FIG. 1). In step 310, the FC attribute is replicated to the new server 102. In step 311, a determination is made as to which version of the conversion routine is to be used to convert the FC attribute to its original format. This is accomplished using the Conversion Routine Field 204 to determine the conversion routine version. It should be recognized that this step 311 is optional, e.g., if there is only one conversion routine, and need not form a part of the conversion process. In step 312, the DNs and blob data are identified and in step 314, they are recombined according to the new syntax using the proper conversion routine as determined in step 311.

In this manner, referential integrity can be maintained for DNs throughout the environment 100, wherein new attributes are maintained on new servers according to the new syntax and on old servers according to the FC syntax described herein.

Figure 4B:
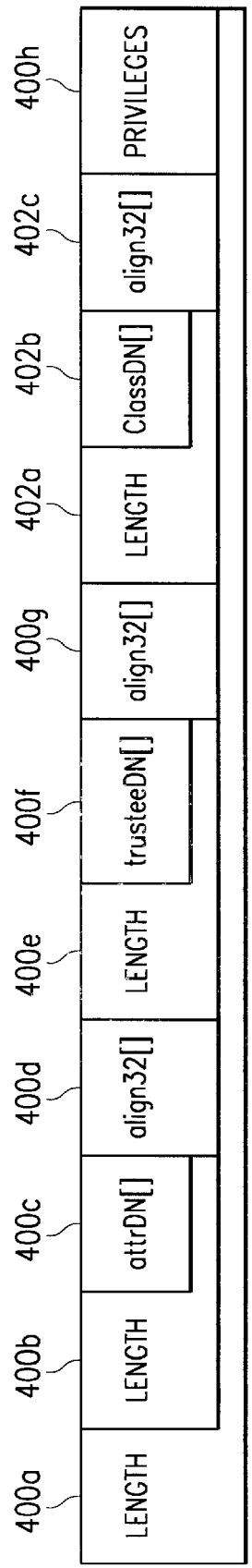

FIGS. 4A and 4B illustrate, respectively, an "old" syntax 400 (in this case, an Access Control List ("ACL") syntax employed in an NDS environment) that is supported by all of the servers 102, 104, 106, 108, of the environment 100, and a "new" syntax 402 (designated "newACL") that is supported by the new servers 102, 104, but not the old servers 106, 108. Operation of the FC syntax will now be described with reference to FIGS. 4A, 4B, and 2.

In general, the ACL syntax 400 is used to control rights; i.e., what one object may do to another. For example, to grant userA the right to modify a Telephone Number attribute of userB, an ACL attribute (syntax ACL 4000) is added to the object for user. As described in greater detail below with reference to FIG. 4A, the ACL syntax 400 includes three fields; namely, "trustee", which in this case will be the DN of userA, "attrDN", or name of the attribute, which in this case is Telephone Number, and "Privileges", which in this case is "WRITE".

In particular, as shown in FIG. 4A, the ACL syntax 400 comprises a first "length" field 400a, a second "length" field 400b, an "attrDN[]" field 400c, a first "align32[]" field 400d, a third "length" field 400e, a "trusteeDN[]" field 400f, a second "align32[]" field 400g, and a "Privileges" field 400h.

The first length field 400a is a 32-bit unsigned integer that gives the length of the entire attribute in bytes. The second length field 400b is a 32-bit unsigned integer that gives the length of the attrDN[] field 400c in bytes. The attrDN[] field 400c contains the DN of the attribute, including a 0 terminator. The first align32[] field 400d comprises 0–3 bytes to make next field (in this case, the third length field 400e) align on a 32-bit boundary. The third length field 400e is a 32-bit unsigned integer that gives the length of the trusteeDN[] field 400f in bytes. The trusteeDN[] field 400f contains the DN of the trustee, including a 0 terminator. The second align32[] field 400g comprises 0–3 bytes to make next field (Privileges field 400h) align on a 32-bit boundary. The privileges field 400h is a 32-bit unsigned integer designating what privileges the trustee has (e.g., WRITE).

Assume now that a new syntax, designated "newACL", is created by adding a new field to the ACL syntax (e.g,. "classDN") to enable rights to be granted that apply only to a particular kind of object as indicated by classDN. In this manner, supervisor rights could be granted that would only apply if the object matched the classDN. As previously indicated, newACL is supported only by new servers 102, 104.

FIG. 4B illustrates an exemplary embodiment of newACL 402, which is identical in all respects to ACL 400, except that it also includes three additional fields between the second align32[] field 400g and the Privileges field 400h; namely, an additional length field 402a, a classDN[] field 402b, and an additional align32[] field 402c. The additional length field 402a is a 32-bit unsigned integer that gives the length of the classDN[] field 402b in bytes. The classDN[] field 402b contains the DN of the class, including a 0 terminator. Finally, the additional align32[] field 402c comprises 0–3 bytes to make the next field (Privileges field 400h) align on a 32-bit boundary.

Referring now to FIGS. 2 and 4B, the FC syntax representation of newACL 402 would include the indicated values in each of the following fields:

len (field 202a): length of FC attribute
    Conversion Routine Version (field 202b): 1, 0
    Name of Attribute (field 202c): NewACL
    Count of DNs (field 202d): 3
    $DN_0$ (field 202e): attrDN
    $DN_1$ (field 202e): trusteeDN
    $DN_2$ (field 202e): classDN
    data len (field 202f): 4
    data (field 202g): Privileges In this manner, each server in the environment 100, regardless of whether the server is an old server, such as the servers 106, 108, or a new server, such as the servers 102, 104, can be caused to maintain the referential ingrity of all DNs throughout the system.

Although an illustrative embodiment has been shown and described, a wide range of modification, change, and substitution is contemplated in the foregoing disclosure and in some instances, some features of the embodiment may be employed without a corresponding use of other features. Accordingly, it is appropriate that the appended claims be construed broadly and in a manner consistent with the scope of the embodiment disclosed herein.

What is claimed is:

1. A method of implementing a new syntax in a network of servers comprising a first set of servers each of which support said new syntax and a second set of servers each of which do not support said new syntax, the method comprising:

prior to replication of said new syntax from a server of said first set of servers to a server of said second set of servers, converting said new syntax to a forward compatibility ("FC") syntax supported by all of said servers of said network, and then replicating said FC syntax to said server of said second set of servers; and responsive to replication of said FC syntax to a server of first set of servers from a server of said second set of servers, converting said FC syntax to said new syntax.

2. The method of claim 1 further comprising replicating said FC syntax from one server of said second set of servers to another server of said second set of servers.

3. The method of claim 1 wherein said new syntax comprises a mixture of a first type of data with respect to which referential integrity is not important and a second type of data with respect to which referential integrity is important, and wherein said converting said new syntax to a FC syntax comprises separating said first type of data from said second type of data and subsequently recombining said first type of data with said second type of data in a manner such that said second type of data is identifiable as such by servers of said second set of servers.

4. The method of claim 3 wherein said second type of data comprises distinguished name data.

5. The method of claim 1 wherein said converting said new syntax to said FC syntax comprises identifying a version of a conversion routine used to convert said new syntax to said FC syntax and storing an identification code for said conversion routine version in a field of said FC syntax.

6. The method of claim 5 wherein said converting said FC syntax to said new syntax comprises using said identification code in said field of said FC syntax to identify said conversion routine version and using said identified conversion routine version to convert said FC syntax to said new syntax.

7. The method of claim 1 wherein said network of servers comprise a directory services environment.

8. The method of claim 7 wherein said directory services environment comprises Novell Directory Services.

9. Apparatus for implementing a new syntax in a network of servers comprising a first set of servers each of which support said new syntax and a second set of servers each of which do not support said new syntax, the apparatus comprising:

means for converting said new syntax to a forward compatibility ("FC") syntax supported by all of said servers of said network prior to replication of said new syntax from a server of said first set of servers to a server of said second set of servers, and then replicating said FC syntax to said server of said second set of servers; and means responsive to replication of said FC syntax to a server of first set of servers from a server of said second set of servers for converting said FC syntax to said new syntax.

10. The apparatus of claim 9 further comprising means for replicating said FC syntax from one server of said second set of servers to another server of said second set of servers.

11. The apparatus of claim 9 wherein said new syntax comprises a mixture of a first type of data with respect to which referential integrity is not important and a second type of data with respect to which referential integrity is important, and wherein said means for converting said new syntax to a FC syntax comprises means for separating said first type of data from said second type of data and subsequently recombining said first type of data with said second type of data in a manner such that said second type of data is identifiable as such by servers of said second set of servers.

12. The apparatus of claim 11 wherein said second type of data comprises distinguished name data.

13. The apparatus of claim 9 wherein said means for converting said new syntax to said FC syntax comprises means for identifying a version of a conversion routine used to convert said new syntax to said FC syntax and storing an identification code for said conversion routine version in a field of said FC syntax.

14. The apparatus of claim 13 wherein said means for converting said FC syntax to said new syntax comprises using said identification code in said field of said FC syntax to identify said conversion routine version and using said identified conversion routine version to convert said FC syntax to said new syntax.

15. The apparatus of claim 9 wherein said network of servers comprise a directory services environment.

16. The apparatus of claim 15 wherein said directory services environment comprises Novell Directory Services.

17. A server for use in a heterogeneous network of servers, the server comprising:

at least one conversion routine for converting a new syntax supported by said server to a forward compatibility("FC") syntax prior to replication of said new syntax to a second server incapable of supporting said new syntax; and at least one conversion routine for converting said FC syntax to said new syntax subsequent to replication of said FC syntax to said sever from another server incapable of supporting said new syntax.

18. The server of claim 17 wherein said new syntax comprise a mixture of data and distinguished names ("DNs").

19. The server of claim 18 wherein said converting said new syntax to a FC syntax comprises separating said DNs from said data and subsequently recombining said DNs with said data in a manner such that said DNs are identifiable as such by a server incapable of supporting said new syntax.

20. The server of claim 17 wherein said at least one conversion routine for converting said new syntax to said FC syntax comprises multiple new-to-FC syntax conversion routine versions, and wherein said converting said new syntax to said FC syntax comprises identifying a version of a new-to-FC syntax conversion routine used to convert said new syntax to said FC syntax and storing an identification code for said new-to-FC syntax conversion routine version in a field of said FC syntax.

21. The server of claim 20 wherein said at least one conversion routine for converting said FC syntax to said new syntax comprises multiple FC-to-new syntax conversion routine versions respectively corresponding to one of said new-to-FC syntax conversion routine versions, and wherein said converting said FC syntax to said new syntax comprises using said identification code in said field of said FC syntax to identify a corresponding FC-to-new syntax conversion routine version and using said identified corresponding FC-to-new syntax conversion routine version to convert said FC syntax to said new syntax.

* * * * *